US012190826B2

(12) United States Patent
Seo et al.

(10) Patent No.: US 12,190,826 B2
(45) Date of Patent: Jan. 7, 2025

(54) GATE DRIVING CIRCUIT

(71) Applicant: Samsung Display Co., Ltd., Yongin-si (KR)

(72) Inventors: Youngwan Seo, Yongin-si (KR); Haemin Kim, Yongin-si (KR); Geunho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/528,233

(22) Filed: Dec. 4, 2023

(65) Prior Publication Data

US 2024/0212625 A1 Jun. 27, 2024

(30) Foreign Application Priority Data

Dec. 23, 2022 (KR) ........................ 10-2022-0183213

(51) Int. Cl.
*G09G 3/3266* (2016.01)

(52) U.S. Cl.
CPC ... *G09G 3/3266* (2013.01); *G09G 2300/0426* (2013.01); *G09G 2310/0286* (2013.01); *G09G 2310/08* (2013.01)

(58) Field of Classification Search
CPC ......... G09G 2310/0286; G09G 3/3266; G09G 3/3677; G09G 2310/08; G09G 3/20; G09G 2310/0267; G09G 2300/0426; G09G 2300/0408; G09G 3/3233; G09G 2330/021; G09G 2300/0819; G09G 3/3225; G09G 3/3674; G09G 2310/0275; G09G 2300/0842; G09G 3/3648; G09G 2300/0861; G09G 2320/0233; G09G 3/3275; G09G 3/3291; G09G 2310/027; G09G 3/3655
See application file for complete search history.

(56) References Cited

U.S. PATENT DOCUMENTS

| | | | |
|---|---|---|---|
| 7,417,458 B2 | 8/2008 | Ahn et al. |
| 8,279,210 B2 | 10/2012 | Im et al. |
| 9,514,704 B2 | 12/2016 | Yoon et al. |
| 9,947,274 B2 | 4/2018 | Park et al. |
| 11,430,402 B2 | 8/2022 | Koo et al. |
| 2023/0186824 A1 | 6/2023 | Park et al. |

FOREIGN PATENT DOCUMENTS

| | | |
|---|---|---|
| KR | 10-1277152 | 6/2013 |
| KR | 10-1493491 | 3/2015 |
| KR | 10-2017-0114067 | 10/2017 |
| KR | 10-2017-0116298 | 10/2017 |
| KR | 10-2023-0090382 | 6/2023 |

*Primary Examiner* — Matthew A Eason
*Assistant Examiner* — Sujit Shah
(74) *Attorney, Agent, or Firm* — KILE PARK REED & HOUTTEMAN PLLC

(57) ABSTRACT

A gate driving circuit from which stable gate signals may be output by minimizing a leakage current of turned-off transistors in case that pull-down transistors output a gate signal and a carry signal of a low-level voltage. Some transistors in the gate driving circuit include two transistors in series to reduce leakage current in an off state, and capacitors are further included to reduce leakage current. Therefore voltages at nodes can be better controlled, and so that the output gate and carry voltages can be stably controlled.

20 Claims, 9 Drawing Sheets

GATE DRIVING CIRCUIT

CROSS-REFERENCE TO RELATED APPLICATIONS

This application claims priority under 35 U.S.C. § 119 from Korean Patent Application No. 10-2022-0183213 filed on Dec. 23, 2022 in the Korean Intellectual Property Office, the entire contents of which are incorporated herein by reference.

BACKGROUND

1. Technical Field

One or more embodiments relate to a gate driving circuit and a display device including the same.

2. Description of the Related Art

In general, a display device includes a pixel portion including multiple pixels, a gate driving circuit, a data driving circuit, and a control circuit (controller). The gate driving circuit includes multiple stages electrically connected to gate lines, and the stages supply gate signals to the gate lines.

SUMMARY

One or more embodiments include a gate driving circuit from which gate signals may be stably output and a display device including the gate driving circuit. The technical effects to be achieved by one or more embodiments may not be limited to the technical effects described above, and other technical effects not described herein will be clearly understood from the description by those of ordinary skill in the art.

Additional aspects will be set forth in part in the description which follows and, in part, will be apparent from the description, or may be learned by practice of the presented embodiments of the disclosure.

According to one or more embodiments, a gate driving circuit including a plurality of stages, each including a node controller that controls voltage levels of a first node and a second node, a first output portion that outputs a gate signal having a voltage of a first level or a voltage of a second level lower than the first level as to a first output terminal according to the voltage levels of the first node and the second node, and a second output portion that outputs a carry output signal having the voltage of the first level or a voltage of a third level lower than the second level to a second output terminal according to the voltage levels of the first node and the second node. The node controller may include a first stabilization transistor and a second stabilization transistor electrically connected in series between the first node and a voltage input terminal to which the voltage of the third level is applied, and a first capacitor electrically connected between the first stabilization transistor and the second stabilization transistor. The first stabilization transistor may be electrically connected between the first node and the first capacitor and including a gate electrically connected to a first clock input terminal to which a first clock signal is applied, and the second stabilization transistor may be electrically connected between the first capacitor and the voltage input terminal to which the voltage of the third level is applied and including a gate electrically connected to the second node.

The node controller may further include an initialization transistor electrically connected between the first node and the voltage input terminal to which the voltage of the third level is applied and including a gate electrically connected to a first carry input terminal to which a next carry signal is applied.

The node controller may further include a first transistor and a second transistor electrically connected in series between a second carry input terminal to which a start signal or a previous carry signal is applied and the first node, wherein the first transistor may be electrically connected between the second carry input terminal and the second transistor and including a gate electrically connected to the second carry input terminal, and a second transistor may be electrically connected between the first transistor and the first node and including a gate electrically connected to a second clock input terminal to which a second clock signal is applied, in case that the start signal or the previous carry signal is the voltage of the first level, the second clock signal may also be the voltage of the first level.

The previous carry signal may be a carry signal output from an immediately preceding stage, and the next carry signal may be a carry signal output from an immediately following stage.

The node controller may further include a third transistor electrically connected between the second clock input terminal and the second node and including a gate electrically connected to the first node, and a fourth transistor electrically connected between the second node and a voltage input terminal to which the voltage of the first level is applied and including a gate electrically connected to the second clock input terminal.

The first clock signal and the second clock signal may alternate between the voltage of the first level and the voltage of the third level, the second clock signal may have a phase difference of about 180 degrees with respect to the first clock signal.

The first output portion may include a first pull-up transistor electrically connected between the first clock input terminal and a first output terminal and including a gate electrically connected to the first node, a first pull-down transistor electrically connected between a voltage input terminal to which the voltage of the second level is applied and the first output terminal and including a gate electrically connected to the second node, and a second capacitor electrically connected between the second node and the voltage input terminal to which the voltage of the second level is applied.

The second output portion may include a first pull-up transistor electrically connected between the first clock input terminal and a first output terminal and including a gate electrically connected to the first node, a first pull-down transistor electrically connected between the voltage input terminal to which the voltage of the third level is applied and the first output terminal and including a gate electrically connected to the second node, and a third capacitor electrically connected between the first node and the first output terminal.

The first pull-up transistor may include a plurality of sub-transistors electrically connected in series.

The first clock signal and a second clock signal may alternate between the voltage of the first level and the voltage of the third level, the first clock signal may have a phase difference of about 180 degrees with respect to the second clock signal.

According to one or more embodiments, a gate driving circuit including a plurality of stages, each including a node controller that controls voltage levels of a first node and a second node, a first output portion that outputs a gate signal having a voltage of a first level or a voltage of a second level lower than the first level to a first output terminal according to the voltage levels of the first node and the second node, and a second output portion that outputs a carry output signal having the voltage of the first level or a voltage of a third level lower than the second level to a second output terminal according to the voltage levels of the first node and the second node. The first output portion may include a first pull-up transistor electrically connected between a first clock input terminal to which a first clock signal is applied and the first output terminal and including a gate electrically connected to the first node, and the second output portion may include a second pull-up transistor electrically connected between the first clock input terminal and the second output terminal and including a gate electrically connected to the first node, and the second pull-up transistor may include a plurality of sub-transistors electrically connected in series.

The first output portion may further include a first pull-down transistor electrically connected between a voltage input terminal to which the voltage of the second level is applied and the first output terminal and including a gate electrically connected to the second node, and a first capacitor electrically connected between the second node and the voltage input terminal to which the voltage of the second level is applied.

The second output portion may further include a second pull-down transistor electrically connected between a voltage input terminal to which the voltage of the third level is applied and the second output terminal and including a gate electrically connected to the second node, and a second capacitor electrically connected between the first node and the second output terminal.

The node controller may include a first transistor and a second transistor electrically connected in series between a first carry input terminal to which a start signal or a previous carry signal is applied and the first node, wherein the first transistor may be electrically connected between a first carry input terminal and the second transistor and including a gate electrically connected to the first carry input terminal, and the second transistor may be electrically connected between the first transistor and the first node and including a gate electrically connected to a second clock input terminal to which a second clock signal is applied, and in case that the start signal or the previous carry signal is the voltage of the first level, the second clock signal may also be the voltage of the first level.

The node controller may include a first transistor electrically connected between a first carry input terminal to which a start signal or a previous carry signal is applied and the first node and including a gate electrically connected to the first carry input terminal.

The node controller may further include a second transistor electrically connected between a second clock input terminal to which a second clock signal is applied and the second node and including a gate electrically connected to the first node, and a third transistor electrically connected between the second node and a voltage input terminal to which the voltage of the first level is applied and including a gate electrically connected to the second clock input terminal.

The first clock signal and the second clock signal may alternate between the voltage of the first level and the voltage of the second level, and the first clock signal may have a phase difference of about 180 degrees with respect to the second clock signal.

The node controller may further include a fourth transistor electrically connected between the first node and a voltage input terminal to which the voltage of the third level is applied and including a gate electrically connected to a second carry input terminal to which a next carry signal is applied.

The node controller may further include a fifth transistor and a sixth transistor electrically connected in series between the first node and the voltage input terminal to which the voltage of the third level is applied, wherein the fifth transistor may be electrically connected between the first node and the sixth transistor and including a gate electrically connected to the first clock input terminal, and the sixth transistor may be electrically connected between the fifth transistor and the voltage input terminal to which the voltage of the third level is applied and including a gate electrically connected to the second node.

The node controller may further include a first capacitor electrically connected between the fifth transistor and the sixth transistor.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
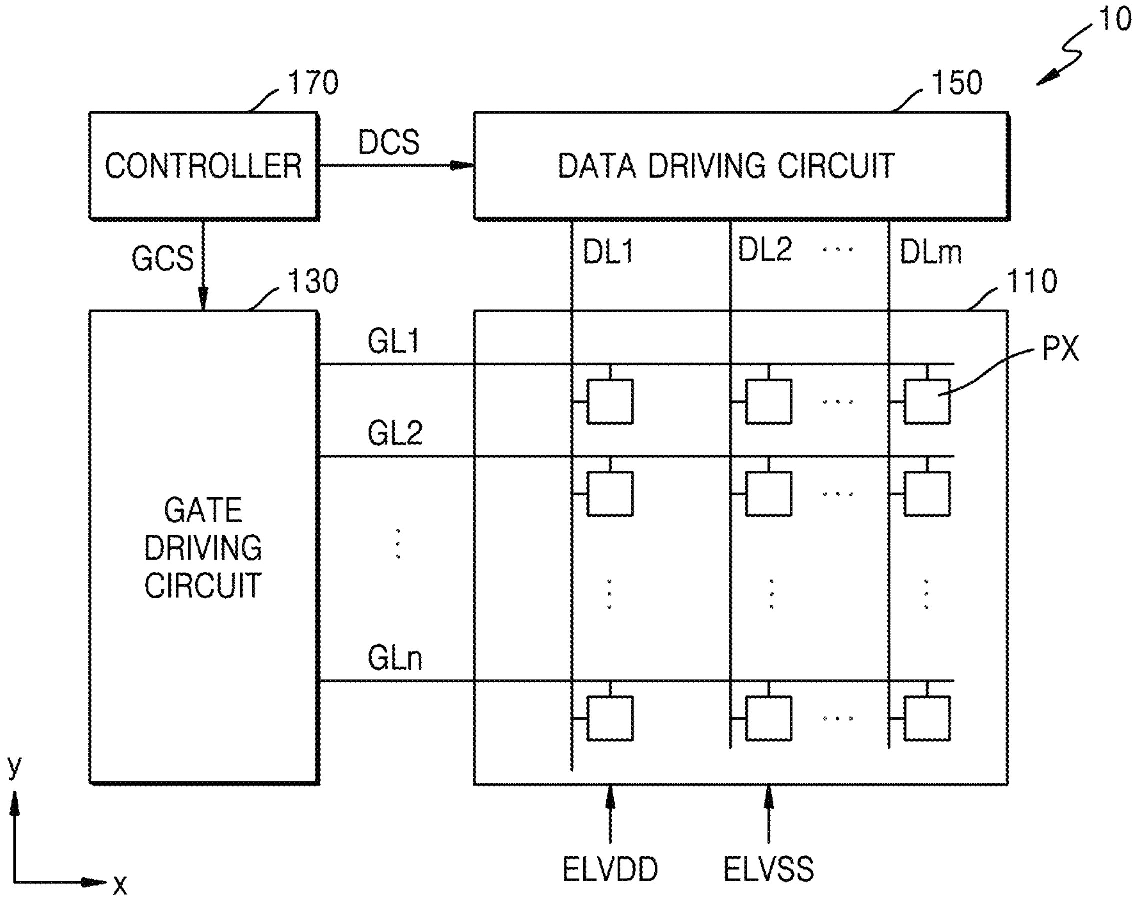
FIG. 1 is a schematic diagram of a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at the same time or predisposed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" May refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may represent different directions that may not be perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" May be construed as X only, Y only, Z only, or any combination of two or more of X, Y, and Z. As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, may not be necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, portion, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein. Hereinafter, embodiments of the disclosure will be described in detail with reference to the accompanying drawings.

As used herein, "ON" or "on" used in association with an element state may denote an activated state of an element, and "OFF" or "off" may denote an inactivated state of an element. "ON" used in association with a signal received by an element may denote a signal activating the element, and "OFF" may denote a signal inactivating the element. An element may be activated by a high-level voltage or a low-level voltage. For example, a P-type transistor (P-channel transistor) may be activated by a low-level voltage, and an N-type transistor (N-channel transistor) may be activated by a high-level voltage. Therefore, it should be understood that "ON" voltages for a P-type transistor and an N-type transistor are opposite (low versus high) voltage levels. Hereinafter, a voltage for activating (turning on) a transistor may be referred to as an on voltage, and a voltage for inactivating (turning off) a transistor may be referred to as an off voltage.

FIG. 1 is a schematic diagram of a display device 10 according to an embodiment. The display device 10 according to an embodiment may be a display device, such as an organic light-emitting display, an inorganic light-emitting display (or an inorganic electroluminescent (EL) display), or a quantum dot light-emitting display. Referring to FIG. 1, the display device 10 according to an embodiment may include a pixel portion 110, a gate driving circuit 130, a data driving circuit 150, and a controller 170. Multiple pixels PX and signal lines configured to input electrical signals to the pixels PX may be arranged in the pixel portion 110.

The pixels PX may be repeatedly arranged in a first direction (direction x, row direction) and a second direction (direction y, column direction). The pixels PX may be arranged in various forms, such as a stripe arrangement, a PenTile® arrangement, a diamond arrangement, and a mosaic arrangement, to display an image. Each of the pixels PX may include an organic light-emitting diode as a display element, and the organic light-emitting diode may be electrically connected to a pixel circuit. The pixel circuit may include multiple transistors and at least one capacitor.

In an embodiment, multiple transistors included in the pixel portion 110 may be N-type oxide thin-film transistors. For example, the oxide thin-film transistors may be low-temperature polycrystalline oxide (LTPO) thin-film transistors. However, this may be an example, and the N-type transistors may not be limited thereto. For example, an active pattern (a semiconductor layer) included in the transistors may instead include an inorganic semiconductor (e.g., amorphous silicon, polysilicon) or an organic semiconductor.

The signal lines configured to input electrical signals to the pixels PX may include multiple gate lines GL1 to GLn extending in the first direction and multiple data lines DL1 to DLm extending in the second direction. The gate lines GL1 to GLn may be spaced apart from each other in the second direction and may be configured to transmit gate signals to the pixels PX. The data lines DL1 to DLm may be spaced apart from each other in the first direction and may be configured to transmit data signals to the pixels PX. Each of the pixels PX may be electrically connected to at least one corresponding gate line from among the gate lines GL1 to GLn and a corresponding data line from among the data lines DL1 to DLm.

The gate driving circuit 130 may be electrically connected to the gate lines GL1 to GLn, and may be configured to generate gate signals in response to a gate driving control signal GCS from the controller 170 and sequentially supply the gate signals to the gate lines GL1 to GLn. The gate lines GL1 to GLn may be electrically connected to the gate of a transistor included in the pixel PX, and each of the gate signals may be a gate control signal for controlling turn-on and turn-off of the transistor to which a gate line may be electrically connected. The gate signal may be a square wave signal including an on voltage at which the transistor may be turned on and an off voltage at which the transistor may be turned off. In an embodiment, the on voltage may be a high-level voltage, and the off voltage may be a low-level voltage.

In case that a period during which the on voltage of a signal may be maintained may be referred to as an on-time, and a period during which the off voltage of a signal may be maintained may be referred to as an off-time, the on-time and off-time of the gate signal may be determined according to the function of a transistor configured to receive the gate signal within the pixel PX. The gate driving circuit 130 may include a shift register for sequentially generating and outputting gate signals.

The data driving circuit 150 may be electrically connected to the plurality of data lines DL1 to DLm, and may be configured to supply data signals to the data lines DL1 to DLm in response to a data driving control signal DCS from the controller 170. The data signals supplied to the data lines DL1 to DLm may be supplied to the pixels PX to which the gate signals may be supplied.

In case that the display device 10 may be an organic light-emitting display device, a first power voltage ELVDD and a second power voltage ELVSS may be supplied to the pixels PX of the pixel portion 110. The first power voltage ELVDD may be a high-level voltage provided to a first electrode (a pixel electrode or an anode) of the organic light-emitting diode included in each pixel PX. The second power voltage ELVSS may be a low-level voltage provided to a second electrode (an opposite electrode or a cathode) of the organic light-emitting diode. The first power voltage ELVDD and the second power voltage ELVSS may be driving voltages that allow the pixels PX to emit light.

The controller 170 may generate the gate driving control signal GCS and the data driving control signal DCS, based on signals input from the outside. The controller 170 may supply the gate driving control signal GCS to the gate driving circuit 130 and may supply the data driving control signal DCS to the data driving circuit 150.

Figure 2:
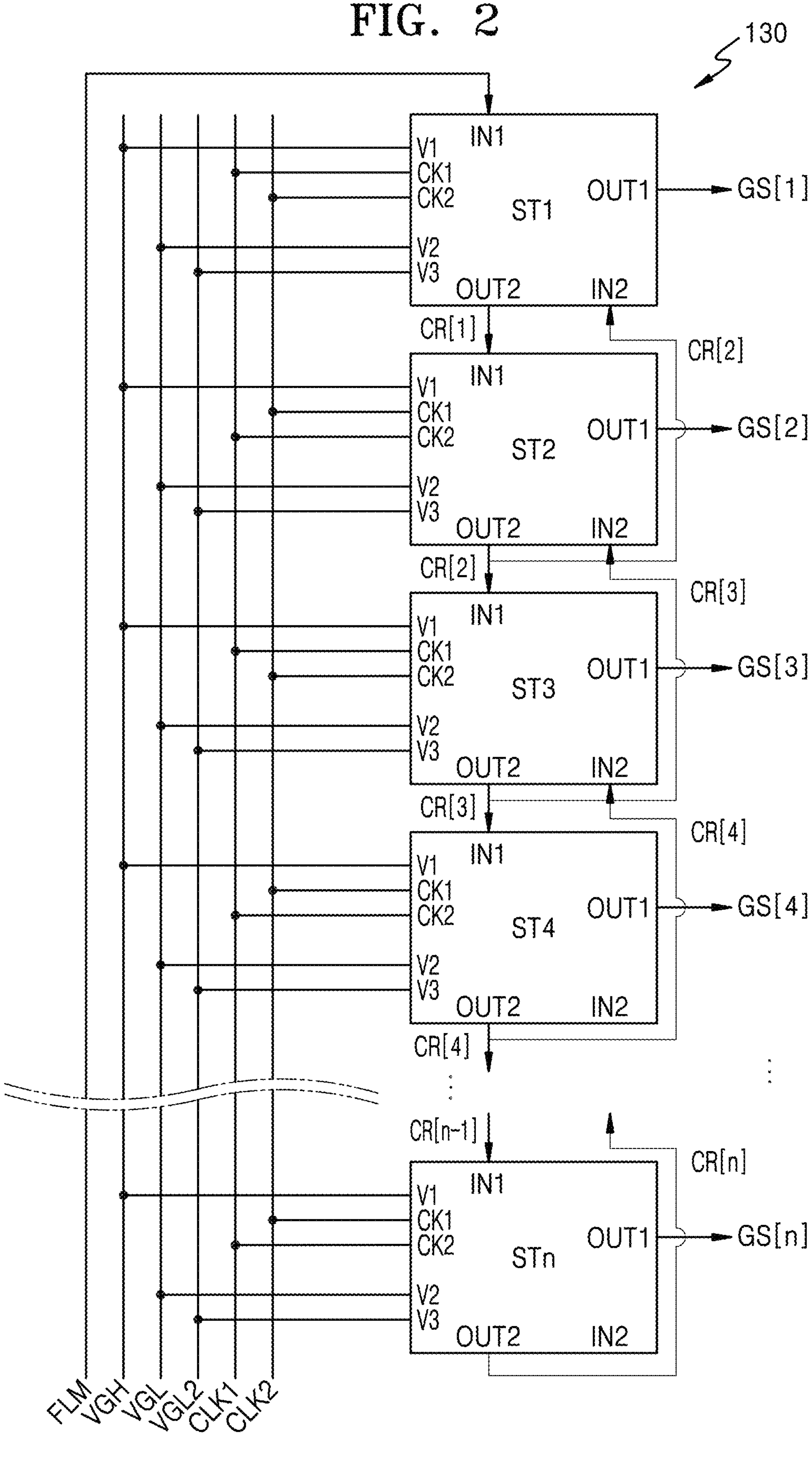
FIG. 2 is a schematic diagram of a gate driving circuit according to an embodiment.
Figure 3:
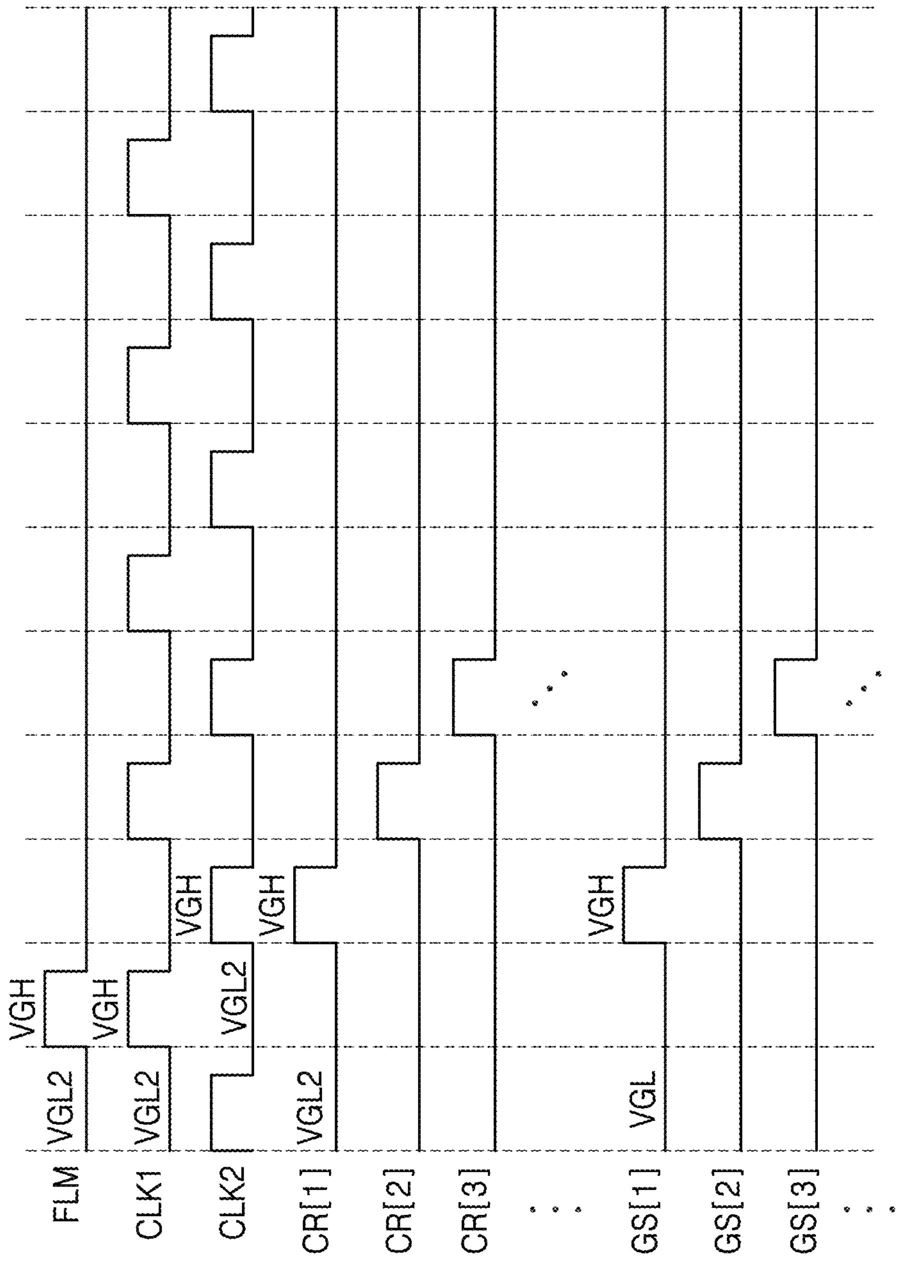
FIG. 3 is a diagram showing timings of input/output signals of the gate driving circuit of FIG. 2.

FIG. 2 is a schematic diagram of the gate driving circuit 130 according to an embodiment, and FIG. 3 is a diagram showing timings of input/output signals of the gate driving circuit 130 of FIG. 2. Referring to FIG. 2, the gate driving circuit 130 may include multiple stages ST1 to STn. The number of stages in the gate driving circuit 130 may be variously modified according to the number of rows in the pixel portion 110. The stages ST1 to STn may output gate signals GS[1], GS[2], GS[3], GS[4], . . . , GS[n]. For example, the n-th stage STn may output the n-th gate signal GS[n] to an n-th gate line GLn.

Each of the stages ST1 to STn may include a first input terminal (or first carry input terminal) IN1, a second input terminal (or second carry input terminal) IN2, a first clock terminal (or first clock input terminal) CK1, a second clock terminal (or second clock input terminal) CK2, a first voltage input terminal V1, a second voltage input terminal V2, a third voltage input terminal V3, a first output terminal OUT1, and a second output terminal OUT2.

A first input signal may be applied (supplied) to the first input terminal IN1. The first input signal may be a start signal FLM, which may be an external signal, or a previous carry signal. In an embodiment, the start signal FLM for controlling a timing of the first gate signal GS[1] may be applied to the first input terminal IN1 of the first stage ST1 as the first input signal. A carry signal output from a previous stage (hereinafter referred to as a 'previous carry signal') may be applied to the first input terminal IN1 of each of the second to n-th stages ST2 to STn other than the first stage ST1 as the first input signal. The previous carry signal may be a carry signal output from an immediately preceding stage. For example, an (n−1)th carry signal CR[n−1] (or n-minus-one-th carry signal; hereinafter "(n−1)th carry signal") output from the (n−1)th stage STn−1 (or n-minus-one-th stage; hereinafter "(n−1)th stage") may be applied to the first input terminal IN1 of the n-th stage STn.

A second input signal may be applied to the second input terminal IN2. The second input signal may be a carry signal output from the next stage (hereinafter referred to as a 'next carry signal'). The next carry signal may be a carry signal output from an immediately following stage. For example, a second carry signal CR2 output from the second stage ST2 may be applied to the second input terminal IN2 of the first stage ST1 as the second input signal. An n-th carry signal CR[n] output from the n-th stage STn may be applied to the second input terminal IN2 of the (n−1)th stage STn−1 as the second input signal.

A first clock signal CLK1 or a second clock signal CLK2 may be applied to a first clock terminal CK1 and a second clock terminal CK2. The first clock signal CLK1 and the second clock signal CLK2 may be alternately applied to the first clock terminals CK1 of the stages ST1 to STn. The second clock signal CLK2 and the first clock signal CLK1 may be alternately applied to the second clock terminals CK2 of the stages ST1 to STn. For example, the first clock signal CLK1 and the second clock signal CLK2 may be applied to the first clock terminal CK1 and the second clock terminal CK2 of the odd-numbered stages ST1, ST3, . . . , respectively. The second clock signal CLK2 and the first clock signal CLK1 may be applied to the first clock terminal CK1 and the second clock terminal CK2 of the even-numbered stages ST2, ST4, . . . , respectively.

As shown in FIG. 3, the first clock signal CLK1 and the second clock signal CLK2 may each be a square wave signal in which a first voltage VGH of a high level and a third voltage VGL2 of a low level may be repeated. A period of each of the first clock signal CLK1 and the second clock signal CLK2 may include one high level and one low level. The first clock signal CLK1 and the second clock signal CLK2 may be signals having the same waveform and shifted phases. For example, the second clock signal CLK2 may be applied having the same waveform as the first clock signal CLK1 and phase-shifted (phase-delayed) therefrom by a certain interval. The second clock signal CLK2 may be a signal having a phase difference of about 180 degrees with respect to the first clock signal CLK1. An on-time of the second clock signal CLK2 may not overlap an on-time of the first clock signal CLK1 because the second clock signal CLK2 may be shifted from the first clock signal CLK1 by a half period.

The first voltage VGH may be applied to the first voltage input terminal V1, a second voltage VGL may be applied to the second voltage input terminal V2, and the third voltage VGL2 may be applied to the third voltage input terminal V3. The third voltage (or very low voltage) VGL2 may have a lower voltage level than the second voltage (or first low voltage) VGL. The first voltage VGH, the second voltage VGL, and the third voltage VGL2 may be global signals and may be applied from the controller 170 shown in FIG. 1 and/or a power supply module, etc. not shown.

A gate signal may be output from the first output terminal OUT1. The gate signals GS[1], GS[2], GS[3], GS[4], . . . , GS[n) output from first output terminals OUT1 of the stages ST1 to STn may be shifted at a certain interval. In an embodiment, the shift interval of the gate signals GS[1], GS[2], GS[3], GS[4], . . . , GS[n] May be the same as the shift interval (e.g., a phase difference of about 180 degrees) of the first clock signal CLK1 and the second clock signal CLK2. Each gate signal may be supplied to a pixel through a corresponding output line, for example, a gate line.

A carry signal (or referred to as "a carry output signal") may be output from the second output terminal OUT2. Carry signals CR[1], CR[2], CR[3], CR[4], . . . , CR[n] output from second output terminals OUT2 of the stages ST1 to STn may be shifted at a certain interval. Each carry signal may be applied to the first input terminal IN1 of the next stage and the second input terminal IN2 of the previous stage. A carry signal output from a dummy stage provided next to the n-th stage STn may be applied to the second input terminal IN2 of the last stage, for example, the n-th stage STn. An on-time of the carry signal output from each of the stages ST1 to STn may be the same as an on-time of the gate signal. An on-time of the carry signal output from each of the stages ST1 to STn may overlap an on-time of the gate signal. A voltage level of the carry signal output from each of the stages ST1 to STn may be the same as a voltage level of the gate signal. A voltage level during an on-time of the carry signal output from each of the stages ST1 to STn and a voltage level during an on-time of the gate signal may be high levels and may be the same as each other. A voltage level during an off-time of the carry signal output from each of the stages ST1 to STn and a voltage level during an off-time of the gate signal may be low levels and may be the same as each other. A voltage level during an off-time of the carry signal output from each of the stages ST1 to STn may be a voltage level of the third voltage VGL2 and may be lower than a voltage level of the second voltage VGL, which may be a voltage level during an off-time of the gate signal.

Although not shown, at least one dummy stage may be further provided next to the last n-th stage STn among the stages ST1 to STn. A carry signal output from the second output terminal OUT2 of the n-th stage may be applied to a first input terminal of the dummy stage. The dummy stage may not be electrically connected to a gate line of the pixel portion 110 (refer to FIG. 1). In some embodiments, the dummy stage may be electrically connected to a dummy gate line, but the dummy gate line may be electrically connected to a dummy pixel that does not display an image, and the dummy stage may not be used to display an image. In some embodiments, the dummy pixel may be omitted, and only the dummy gate line may be provided around the pixel portion 110.

Figure 4:
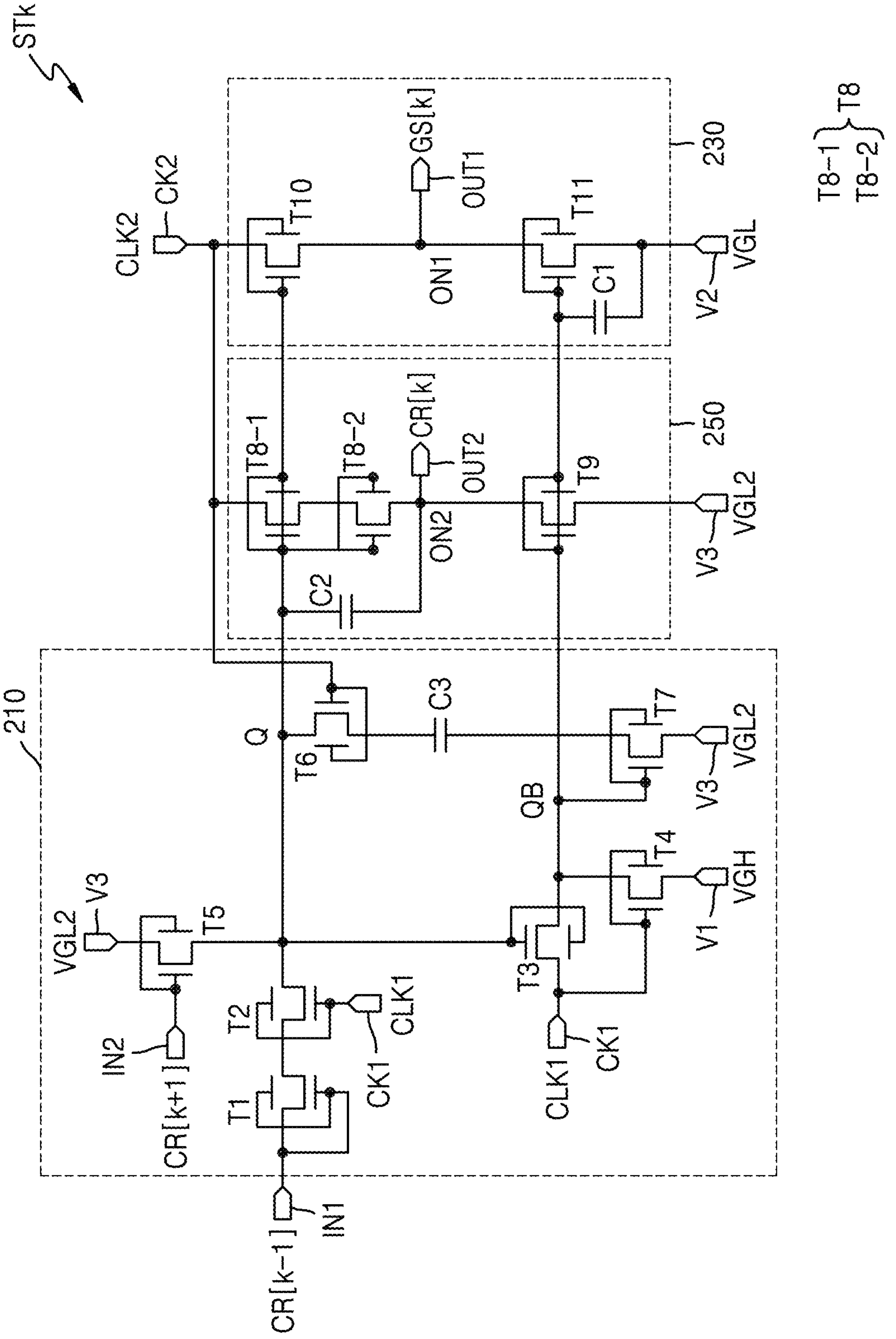
FIG. 4 is a schematic circuit diagram showing an example of an arbitrary stage constituting the gate driving circuit of FIG. 2.

FIG. 4 is a schematic circuit diagram showing an example of an arbitrary stage constituting the gate driving circuit 130 of FIG. 2. Each of the stages ST1 to STn includes a multiple nodes, and hereinafter, some of the nodes may be referred to as first and second output nodes ON1 and ON2 and first and second nodes (or first and second internal nodes) Q and QB.

The k-th stage STk (where k may be a natural number) shown in FIG. 4 may be the stage corresponding to a k-th row of the pixel portion 110. The k-th stage STk may receive a (k−1)th carry signal (hereinafter referred to as "a previous carry signal") CR[k−1] from a previous (k−1)th stage, may receive a (k+1)th carry signal CR[k+1] (or k-plus-one-th carry signal; hereinafter referred to as "(k+1)th carry signal" or "a next carry signal") from a next (k+1)th stage(or k-plus-one-th stage; hereinafter referred to as "(k+1)th stage"), may output a k-th gate signal GS[k] to a gate line of the k-th row, and may output a k-th carry signal CR[k] to the first input terminal IN1 of the (k+1)th stage. In case that k is 1, for example, the first stage ST1 may receive the start signal FLM via the first input terminal IN1.

In an odd-numbered stage, the first clock terminal CK1 may receive the first clock signal CLK1, and the second clock terminal CK2 may receive the second clock signal CLK2. In an even-numbered stage, the first clock terminal CK1 may receive the second clock signal CLK2, and the second clock terminal CK2 may receive the first clock signal CLK1. Hereinafter, for convenience of description, a case where the stage STk may be an odd-numbered stage that receives a previous carry signal via the first input terminal IN1 may be described as an example.

The stage STk may include a node controller 210, a first output portion 230, and a second output portion 250. Each of the node controller 210, the first output portion 230, and the second output portion 250 may include at least one transistor.

The at least one transistor may be an N-type transistor. The at least one transistor may be an N-type oxide semiconductor transistor. Some of the at least one transistor may be a dual gate transistor including a pair of first and second gates. In an embodiment, the pair of first and second gates may be respectively disposed on different layers with a semiconductor therebetween. For example, the first gate may be a top gate disposed above a semiconductor, and the second gate may be a bottom gate disposed under the semiconductor. In an embodiment, the pair of first and second gates may receive the same signal. In case that the oxide semiconductor transistor may be a dual gate transistor including a pair of gates, the effect of blocking external light may be obtained due to the bottom gate while reducing a size of the transistor (e.g., a ratio of channel width to channel length (W/L)).

The previous carry signal CR[k−1] May be applied to the first input terminal IN1, the next carry signal CR[k+1] May be applied to the second input terminal IN2, the first clock signal CLK1 may be applied to the first clock terminal CK1, the second clock signal CLK2 may be applied to the second clock terminal CK2, the first voltage VGH may be applied to the first voltage input terminal V1, the second voltage VGL may be applied to the second voltage input terminal V2, and the third voltage VGL2 may be applied to the third voltage input terminal V3.

The node controller 210 may control voltage levels of the first node Q and the second node QB. The node controller 210 may include a first transistor T1, a second transistor T2, a third transistor T3, a fourth transistor T4, a fifth transistor T5, a sixth transistor T6, and a seventh transistor T7. The node controller 210 may further include a third capacitor C3.

The first transistor T1 may be electrically connected between the first input terminal IN1 and the first node Q. The first transistor T1 may be configured to control a voltage level of the first node Q by transferring a voltage of the previous carry signal CR[k−1] to the first node Q. The first transistor T1 may include a gate electrically connected to the first input terminal IN1. The gate may include a first gate and a second gate. The first transistor T1 may be turned on in case that the previous carry signal CR[k−1] May be a high-level voltage. The first transistor T1 may be implemented as a diode-connected transistor having a gate electrically connected to the first input terminal IN1, and thus, in case that the first transistor T1 is in an off state, for example, in case that the previous carry signal CR[k−1] is a low-level voltage, a drain-source voltage Vds, which may be a voltage between both terminals of the first transistor T1, may be maintained at 0 V, and accordingly, a leakage current of the first transistor T1 may be minimized. The leakage current of a transistor may be the current flowing through the transistor in case that the transistor is in an off state.

The second transistor T2 may be electrically connected between the first transistor T1 and the first node Q, and the first transistor T1 and the second transistor T2 may be electrically connected in series between the first input terminal IN1 and the first node Q. The second transistor T2 may be configured to transfer a voltage of the previous carry signal CR[k−1] transferred through the first transistor T1 to the first node Q. The second transistor T2 may include a gate electrically connected to the first clock terminal CK1. The gate may include a first gate and a second gate. The second transistor T2 may be turned on in case that the first clock signal CLK1 applied to the first clock terminal CK1 is a high-level voltage.

A high-level voltage of the previous carry signal CR[k−1] and a high-level voltage of the first clock signal CLK1 may each be the first voltage VGH and may be the same as each other. A low-level voltage of the previous carry signal CR[k−1] and a low-level voltage of the first clock signal CLK1 may each be the third voltage VGL2 and may be the same as each other. The first transistor T1 and the second transistor T2 may be electrically connected in series, and thus, a leakage current of the first transistor T1 may be minimized.

The third transistor T3 may be electrically connected between the first clock terminal CK1 and the second node QB and may include a gate electrically connected to the first node Q. The gate may include a first gate and a second gate. The third transistor T3 may be turned on in case that the first node Q has a high-level voltage, and may be configured to transfer the first clock signal CLK1 transmitted through the first clock terminal CK1 to the second node QB.

The fourth transistor T4 may be electrically connected between the first voltage input terminal V1 and the second node QB and may include a gate electrically connected to the first clock terminal CK1. The gate may include a first gate and a second gate. The fourth transistor T4 may be turned on in case that the first clock signal CLK1 may be a high-level voltage, and may be configured to transfer the first voltage VGH transferred through the first voltage input terminal V1 to the second node QB.

The fifth transistor T5 may be electrically connected between the third voltage input terminal V3 and the first node Q and may include a gate electrically connected to the second input terminal IN2. The gate may include a first gate and a second gate. The fifth transistor T5 may be turned on in case that the next carry signal CR[k+1] May be a high-level voltage, and may be configured to transfer the third voltage VGL2 transferred through the third voltage input terminal V3 to the first node Q. The fifth transistor T5 may be an initialization transistor configured to set a voltage of the first node Q to a low-level voltage.

The sixth transistor T6 and the seventh transistor T7 may be electrically connected between the first node Q and the third voltage input terminal V3. The sixth transistor T6 and the seventh transistor T7 may be stabilization transistors configured to maintain a voltage of the first node Q at a low-level voltage during a period in case that a gate signal of an off voltage is output to a gate line. The third capacitor C3 may be electrically connected between the sixth transistor T6 and the seventh transistor T7.

The sixth transistor T6 may be electrically connected between the first node Q and the third capacitor C3. The sixth transistor T6 may include a gate electrically connected to the second clock terminal CK2. The gate may include a first gate and a second gate. The sixth transistor T6 may be turned on in case that the second clock signal CLK2 may be a high-level voltage.

The seventh transistor T7 may be electrically connected between the third capacitor C3 and the third voltage input terminal V3. The seventh transistor T7 may include a gate electrically connected to the second node QB. The gate may include a first gate and a second gate. The seventh transistor T7 may be turned on in case that the second node QB has a high-level voltage.

The third capacitor C3 may include a first terminal electrically connected to the sixth transistor T6 and a second terminal electrically connected to the seventh transistor T7. The third capacitor C3 may be provided, and thus, even in case that the sixth transistor T6 may be turned on due to the second clock signal CLK2 of a high-level voltage, during the period in case that a gate signal of an off voltage is output to a gate line, a current path toward a voltage source supplying the third voltage VGL2 through the sixth transistor T6 and the seventh transistor T7 may be blocked.

The first output portion 230 may output a gate signal having the voltage level of an on voltage or a gate signal having the voltage level of an off voltage according to voltage levels of the first node Q and the second node QB. The first output portion 230 may transfer the first voltage VGH or the second voltage VGL to the first output terminal OUT1 electrically connected to the first output node ON1 according to voltage levels of the first node Q and the second node QB. A high-level voltage of the first voltage VGH or a low-level voltage of the second voltage VGL may be output from the first output terminal OUT1 as the gate signal GS[k]. The first output portion 230 may include a tenth transistor T10 and an eleventh transistor T11. The first output portion 230 may further include a first capacitor C1.

The tenth transistor T10 may be electrically connected between the second clock terminal CK2 and the first output node ON1. The tenth transistor T10 may include a gate electrically connected to the first node Q. The gate may include a first gate and a second gate. The tenth transistor T10 may be turned on or turned off in response to a voltage level of the first node Q. The tenth transistor T10 may be a pull-up transistor for outputting a high-level voltage. In case that a voltage of the first node Q is a high-level voltage, the tenth transistor T10 may be turned on to transfer the second clock signal CLK2 of the first voltage VGH applied through the second clock terminal CK2 to the first output node ON1.

The eleventh transistor T11 may be electrically connected between the first output node ON1 and the second voltage input terminal V2. The eleventh transistor T11 may include a gate electrically connected to the second node QB. The gate may include a first gate and a second gate. The eleventh transistor T11 may be turned on or turned off in response to a voltage level of the second node QB. The eleventh transistor T11 may be a pull-down transistor for outputting a low-level voltage. In case that a voltage of the second node QB is a high-level voltage, the eleventh transistor T11 may be turned on to transfer the second voltage VGL applied through the second voltage input terminal V2 to the first output node ON1.

The first capacitor C1 may be electrically connected between the second node QB and the second voltage input terminal V2. A voltage of the second node QB may be stably maintained by the first capacitor C1.

The second output portion 250 may output a carry signal having the voltage level of an on voltage or a carry signal having the voltage level of an off voltage according to voltage levels of the first node Q and the second node QB. The second output portion 250 may transfer the first voltage VGH or the third voltage VGL2 to the second output terminal OUT2 electrically connected to the second output node ON2 according to voltage levels of the first node Q and the second node QB. A high-level voltage of the first voltage VGH or a low-level voltage of the third voltage VGL2 may be output from the second output terminal OUT2 as the carry signal CR[k]. The second output portion 250 may include an eighth transistor T8 and a ninth transistor T9. The second output portion 250 may further include a second capacitor C2.

The eighth transistor T8 may be electrically connected between the second clock terminal CK2 and the second output node ON2. The eighth transistor T8 may be a pull-up transistor for outputting a high-level voltage. In case that the eighth transistor T8 is in an off state, a leakage current flowing through the eighth transistor T8 may occur at the moment in case that the second clock signal CLK2 transitions from a low level to a high level, and the leakage current of the eighth transistor T8 may be minimized by adjusting a size of the eighth transistor T8. The eighth transistor T8 may include a multiple sub-transistors electrically connected in series between the second clock terminal CK2 and the second output node ON2. In an embodiment, a size of the eighth transistor T8 may be adjusted by adjusting the number and/or size of the sub-transistors. The sub-transistors may include a pair of an 8-1 transistor T8-1 and an 8-2 transistor T8-2. The eighth transistor T8 may include multiple sub-transistors, and thus, during the period in case that a gate signal outputs an off voltage, in case that the second clock signal CLK2 may be a high-level voltage, a leakage current of the eighth transistor T8 may be minimized.

The 8-1 transistor T8-1 may be electrically connected between the second clock terminal CK2 and the 8-2 transistor T8-2 and may include a gate electrically connected to the first node Q. The gate may include a first gate and a second gate. The 8-1 transistor T8-1 may be turned on or turned off in response to a voltage level of the first node Q.

The 8-2 transistor T8-2 may be electrically connected between the 8-1 transistor T8-1 and the second output node ON2 and may include a gate electrically connected to the first node Q. The gate may include a first gate and a second gate. The 8-2 transistor T8-2 may be turned on or turned off in response to a voltage level of the first node Q.

In case that a voltage of the first node Q is a high-level voltage, the 8-1 transistor T8-1 and the 8-2 transistor T8-2 may be turned on to transfer the second clock signal CLK2 of the first voltage VGH applied through the second clock terminal CK2 to the second output node ON2.

The ninth transistor T9 may be electrically connected between the second output node ON2 and the third voltage input terminal V3. The ninth transistor T9 may include a gate electrically connected to the second node QB. The gate may include a first gate and a second gate. The ninth transistor T9 may be turned on or turned off in response to a voltage level of the second node QB. The ninth transistor T9 may be a pull-down transistor for outputting a low-level voltage. In case that a voltage of the second node QB may be a high-level voltage, the ninth transistor T9 may be turned on to transfer the third voltage VGL2 applied through the third voltage input terminal V3 to the second output node ON2.

The second capacitor C2 may be electrically connected between the first node Q and the second output node ON2. A voltage of the first node Q may be boosted by the second capacitor C2.

Figure 5:
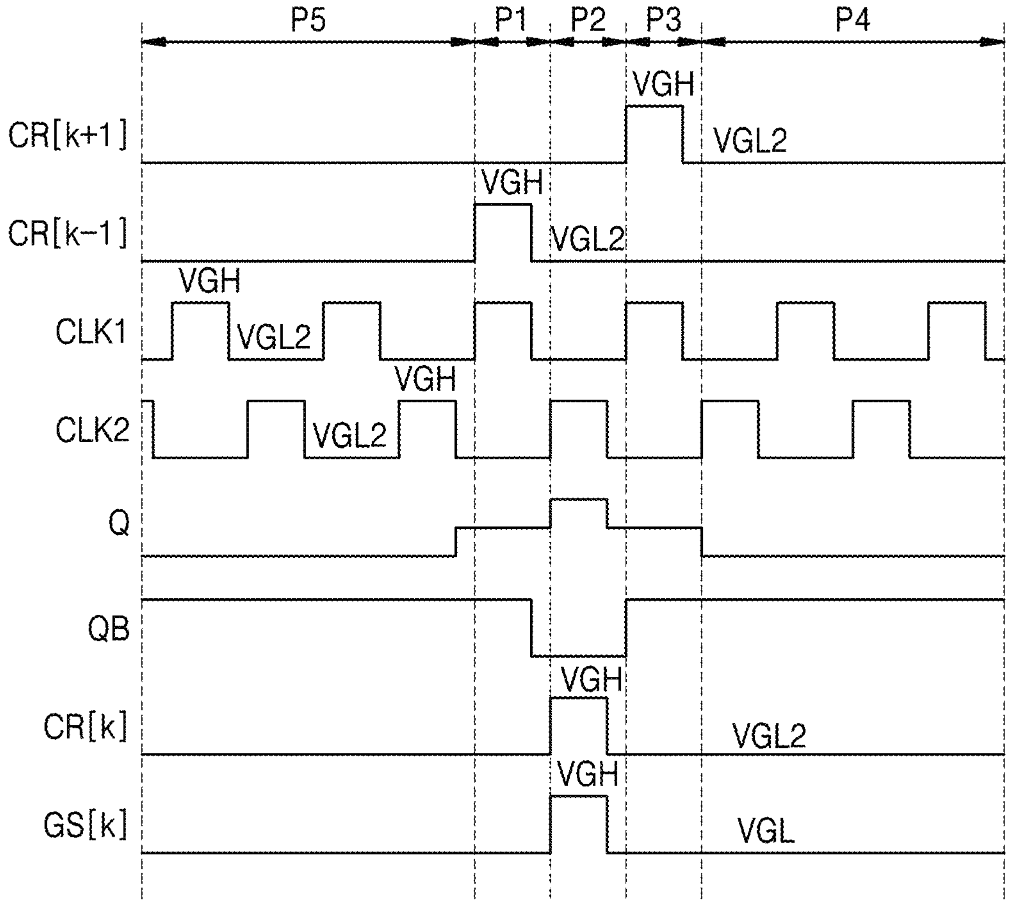
FIG. 5 is a waveform diagram showing an example of the operation of a stage during one frame shown in FIG. 4.
Figure 6:
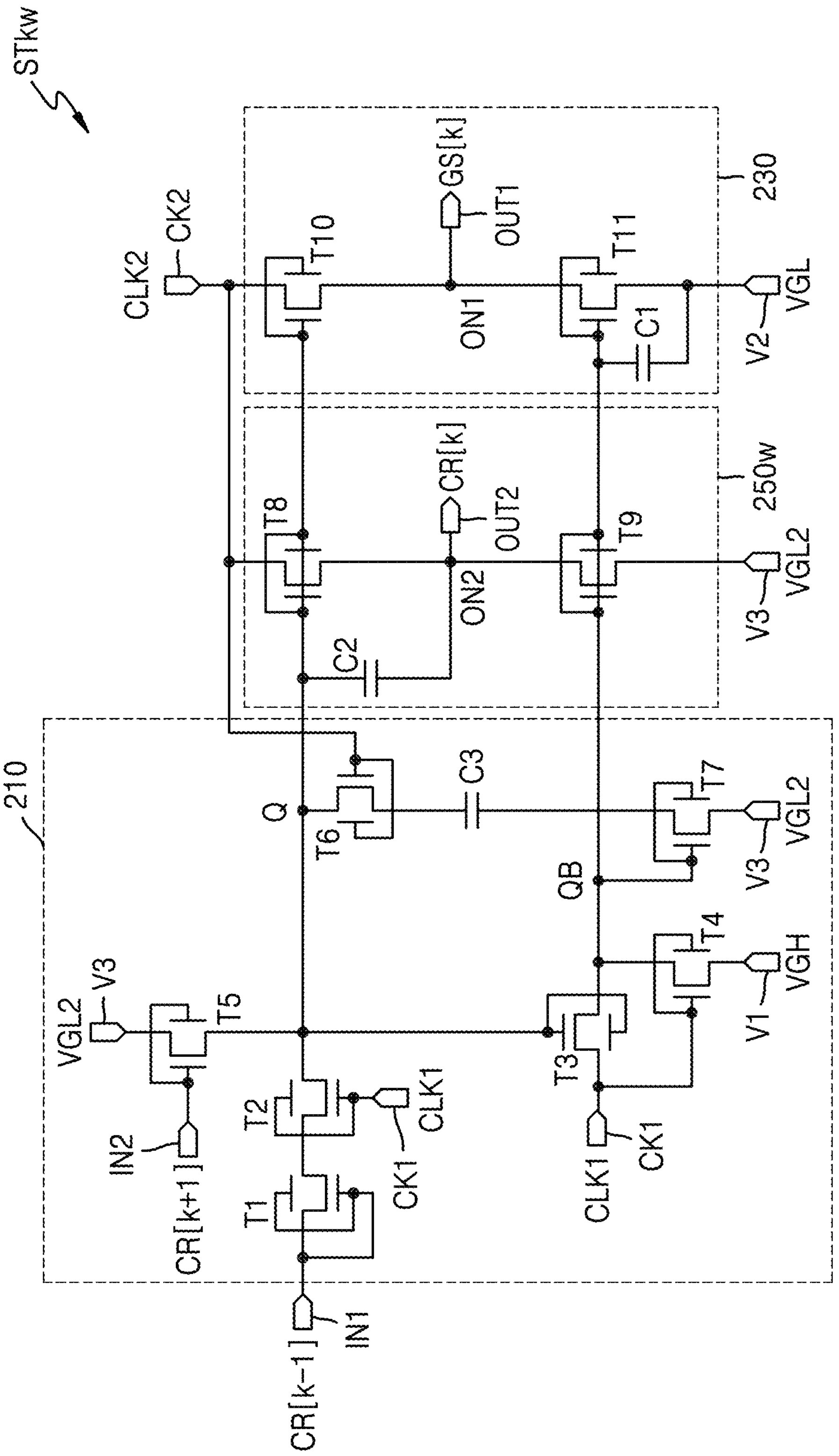
FIGS. 6 to 9 are schematic circuit diagrams showing various modifications of a stage circuit according to an embodiment.

FIG. 5 is a waveform diagram showing an example of the operation of a stage during one frame shown in FIG. 4. Hereinafter, for convenience of description, a voltage level of the first voltage VGH may be expressed as a high level, and voltage levels of the second and third voltages VGL and VGL2 may be expressed as low levels. The voltage level of the third voltage VGL2 may be lower than the voltage level of the second voltage VGL.

In FIG. 5, the previous carry signal CR[k−1] applied to the first input terminal IN1, the next carry signal CR[k+1] applied to the second input terminal IN2, the first clock signal CLK1 applied to the first clock terminal CK1, the second clock signal CLK2 applied to the second clock terminal CK2, node voltages of the first and second nodes Q and QB, and the carry signal CR[k] and the gate signal GS[k], which may be output signals, are shown.

During a first period P1, the previous carry signal CR[k−1] may be input transitioned from a low-level voltage to a high-level voltage, the first clock signal CLK1 may be a high-level voltage, and the second clock signal CLK2 may be a low-level voltage.

The first transistor T1 may be turned on by the previous carry signal CR[k−1] of a high-level voltage, and the second transistor T2 may be turned on by the first clock signal CLK1 of a high-level voltage. The previous carry signal CR[k−1] may be transferred to the first node Q by the turned-on first and second transistors T1 and T2, and thus, the first node Q may be in a high-level state. In this regard, a voltage level of the first node Q may not be the voltage level at which the eighth transistor T8 and the tenth transistor T10 may be turned on.

The fourth transistor T4 having a gate electrically connected to the first clock terminal CK1 may be turned on, and thus, the first voltage VGH of a high-level voltage may be transferred to the second node QB. Accordingly, the ninth transistor T9 and the eleventh transistor T11 each having a gate electrically connected to the second node QB may be turned on. The turned-on eleventh transistor T11 may be configured to transfer the low-level second voltage VGL to the first output node ON1, and the gate signal GS[k] of a low-level voltage may be output from the first output terminal OUT1. The turned-on ninth transistor T9 may be configured to transfer the low-level third voltage VGL2 to the second output node ON2, and the carry signal CR[k] of a low-level voltage may be output from the second output terminal OUT2.

During a second period P2, the previous carry signal CR[k−1] may be input transitioned from a high-level voltage to a low-level voltage, the first clock signal CLK1 may be a low-level voltage, and the second clock signal CLK2 may be a high-level voltage.

The first transistor T1 may be turned off by the previous carry signal CR[k−1] of a low-level voltage, and the second transistor T2 may be turned off by the first clock signal CLK1 of a low-level voltage. The first node Q in a floating state due to the turned-off first and second transistors T1 and T2 may have a high-level voltage at a higher level than that during the first period P1 due to the second capacitor C2 as the carry signal CR[k] of a high-level voltage may be output in synchronization with the second clock signal CLK2 of a high-level voltage. Accordingly, the eighth transistor T8 and the tenth transistor T10 each having a gate electrically connected to the first node Q may be turned on. The turned-on tenth transistor T10 may be configured to transfer the second clock signal CLK2 of a high-level voltage to the first output node ON1, and the gate signal GS[k] of a high-level voltage may be output from the first output terminal OUT1. The turned-on eighth transistor T8 may be configured to transfer the second clock signal CLK2 of a high-level voltage to the second output node ON2, and the carry signal CR[k] of a high-level voltage may be output from the second output terminal OUT2.

The fourth transistor T4 may be turned off by the first clock signal CLK1 of a low-level voltage, and the third transistor T3 having a gate electrically connected to the first node Q may be turned on, and thus, the first clock signal CLK1 of a low-level voltage may be transferred to the second node QB. Accordingly, the ninth transistor T9 and the eleventh transistor T11 each having a gate electrically connected to the second node QB may be turned off.

During a third period P3, the previous carry signal CR[k−1] may be a low-level voltage, the next carry signal CR[k+1] may be input transitioned from a low-level voltage to a high-level voltage, the first clock signal CLK1 may be a high-level voltage, and the second clock signal CLK2 may be a low-level voltage.

The fifth transistor T5 may be turned on by the next carry signal CR[k+1] of a high-level voltage, and thus, the third voltage VGL2 of a low-level voltage may be transferred to the first node Q. Accordingly, the eighth transistor T8 and the tenth transistor T10 each having a gate electrically connected to the first node Q may be turned off.

The third transistor T3 having a gate electrically connected to the first node Q may be turned off, and the fourth transistor T4 having a gate electrically connected to the first clock terminal CK1 may be turned on, and thus, the first voltage VGH of a high-level voltage may be transferred to the second node QB. Accordingly, the ninth transistor T9 and the eleventh transistor T11 each having a gate electrically connected to the second node QB may be turned on. The turned-on eleventh transistor T11 may be configured to transfer the low-level second voltage VGL to the first output node ON1, and the gate signal GS[k] of a low-level voltage may be output from the first output terminal OUT1. The turned-on ninth transistor T9 may be configured to transfer the low-level third voltage VGL2 to the second output node ON2, and the carry signal CR[k] of a low-level voltage may be output from the second output terminal OUT2.

As the first node Q has the third voltage VGL2 of the previous carry signal CR[k−1], and the first output node ON1 has the second voltage VGL, a gate-source voltage Vgs of the tenth transistor T10 in a turned-off state may be less than about 0, and thus, a leakage current of the tenth transistor T10 may be minimized.

Although the first node Q and the second output node ON2 have the third voltage VGL2, and thus, the gate-source voltage Vgs of the eighth transistor T8 in a turned-off state may be about 0, the eighth transistor T8 may include a pair of the 8-1 transistor T8-1 and the 8-2 transistor T8-2, and thus, a leakage current of the eighth transistor T8 may be minimized.

During a fourth period P4 and a fifth period P5, the previous carry signal CR[k−1] and the next carry signal CR[k+1] may each be a low-level voltage, and the first clock signal CLK1 and the second clock signal CLK2 may have a low-level voltage and a high-level voltage alternately input to the first clock terminal CK1 and the second clock terminal CK2. During the fourth period P4 and the fifth period P5, the first node Q may maintain a low-level voltage, and the second node QB may maintain a high-level voltage. Accordingly, the gate signal GS[k] of a low-level voltage may be continuously output from the first output terminal OUT1, and the carry signal CR[k] of a low-level voltage may be continuously output from the second output terminal OUT2. The fourth period P4 and the fifth period P5 may be the period during which a gate signal and a carry signal each output a low-level voltage.

The first transistor T1 may be implemented as a diode-connected transistor having a gate and a source electrically connected to the first input terminal IN1, and thus, a leakage current of the first transistor T1 may be minimized during the fourth period P4 and the fifth period P5. The second transistor T2 may be electrically connected to the first transistor T1 in series, and thus during the fourth period P4 and the fifth period P5, a leakage current of the first transistor T1 may be minimized. The eighth transistor T8 may include multiple sub-transistors electrically connected in series, and thus, during the fourth period P4 and the fifth period P5, a leakage current of the eighth transistor T8 may be minimized. The third capacitor C3 may be provided between the sixth transistor T6 and the seventh transistor T7, and thus, during the fourth period P4 and the fifth period P5, a path of the leakage current from transistors electrically connected to a relatively high voltage source toward a voltage source supplying the third voltage VGL2 through the sixth transistor T6 and the seventh transistor T7 may be blocked.

FIGS. 6 to 9 are schematic diagrams showing various modifications of a stage circuit according to an embodiment. The stage STkw shown in FIG. 6 may be different from the stage STk shown in FIG. 4, in that the eighth transistor T8 of the second output portion 250*w* may be a single dual gate transistor. Other configurations and operations of the stage shown in FIG. 6 may be the same as those of the stage STk shown in FIG. 4.

Figure 7:
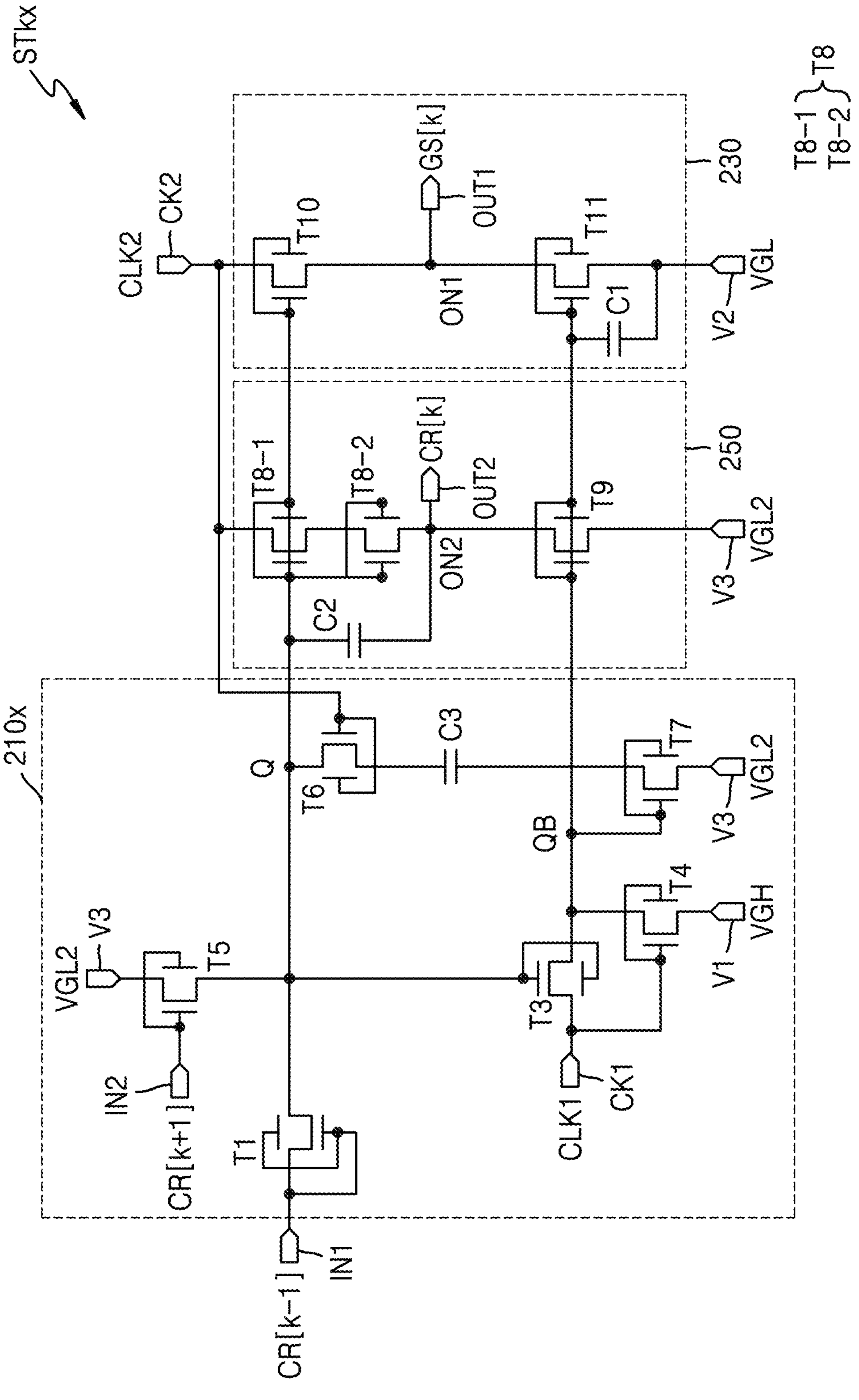

The stage STkx shown in FIG. 7 may be different from the stage STk shown in FIG. 4 in that the second transistor T2 of the node controller 210 of FIG. 4 may be omitted in the node controller 210*x* of FIG. 7. In case that the second transistor T2 is omitted, low-level voltages of the first clock signal CLK1 and the second clock signal CLK2 may be the second voltage VGL. For example, the first clock signal CLK1 and the second clock signal CLK2 may alternate between the first voltage VGH and the second voltage VGL. Other configurations and operations of the stage STkx shown in FIG. 7 may be the same as those of the stage STk shown in FIG. 4.

Figure 8:
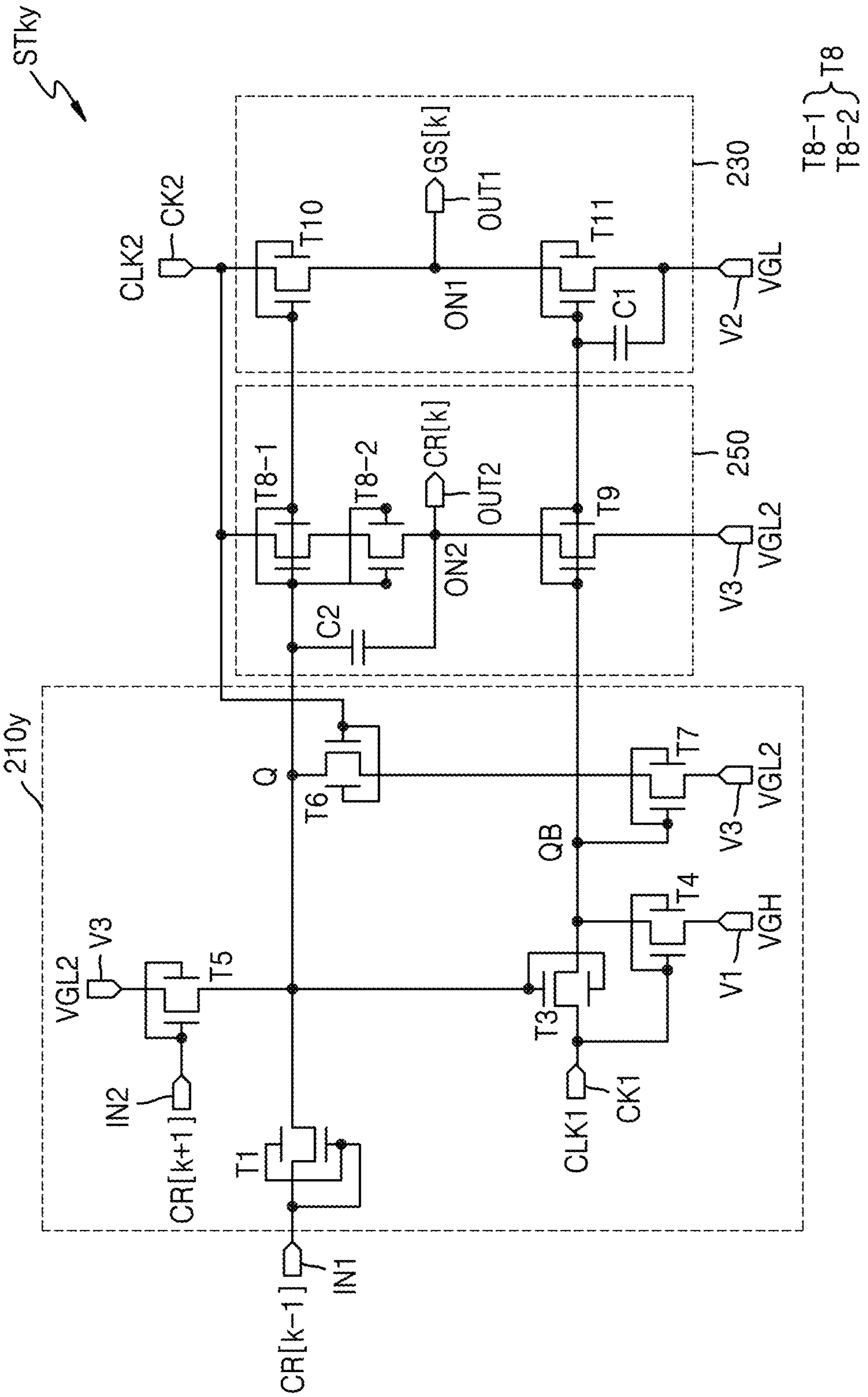

The stage STky shown in FIG. 8 may be different from the stage STkx shown in FIG. 7, in that the third capacitor C3 of the node controller 210*x* of FIG. 7 may be omitted in node controller 210*y* of FIG. 8. Other configurations and operations of the stage STky shown in FIG. 8 may be the same as those of the stage STkx shown in FIG. 7.

Figure 9:
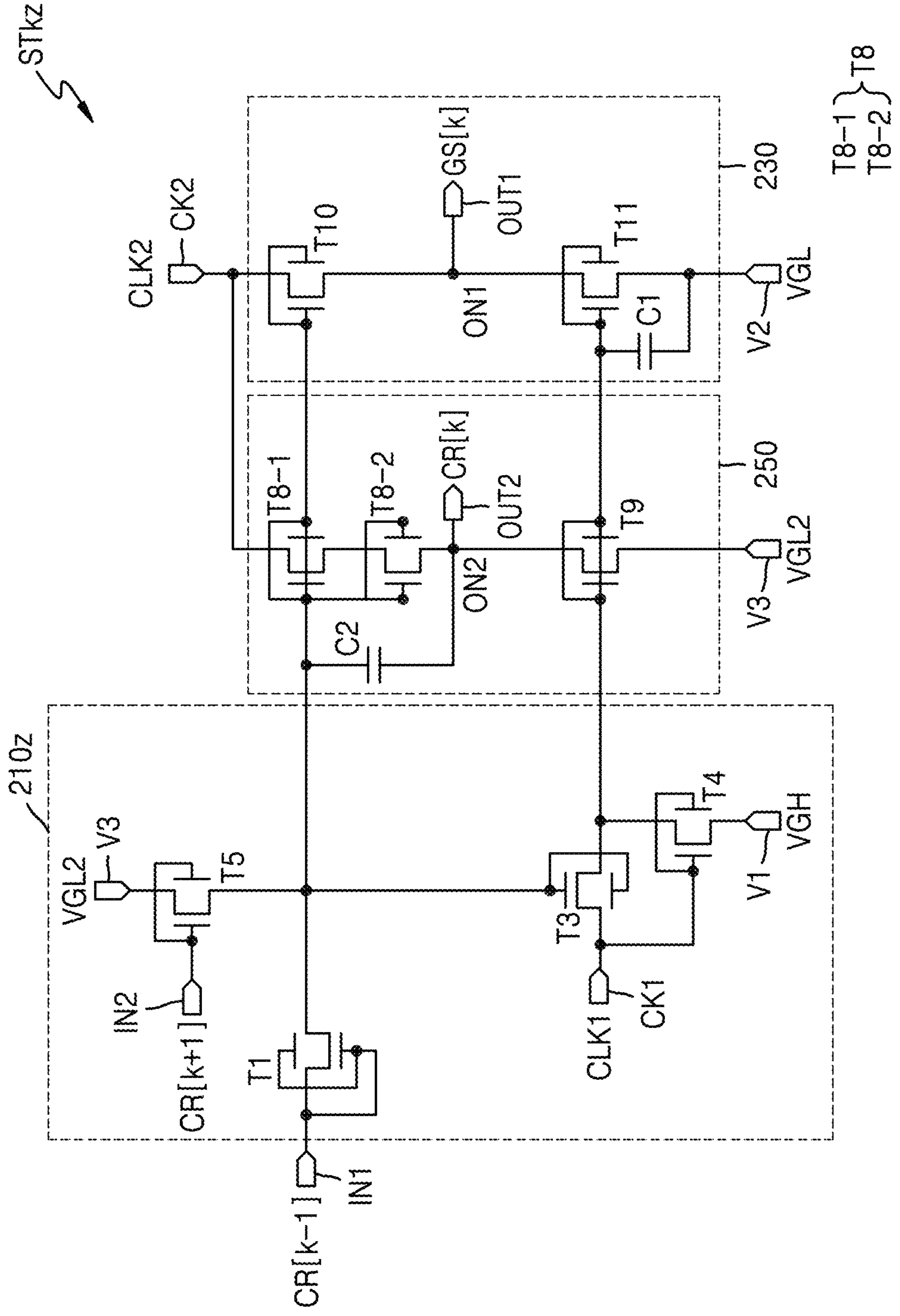

The stage STkz shown in FIG. 9 may be different from the stage STkx shown in FIG. 7, in that the sixth transistor T6, the seventh transistor T7, and the third capacitor C3 of the node controller 210*x* of FIG. 7 may be omitted from the node controller 210*z* of FIG. 9. Other configurations and operations of the stage STkz shown in FIG. 9 may be the same as those of the stage STkx shown in FIG. 7.

A gate driving circuit according to one or more embodiments includes N-type oxide semiconductor transistors, and the N-type oxide semiconductor transistors may be implemented as a dual gate transistor. A pair of gates of the dual gate transistor may receive the same signal. A gate signal and a carry signal output by the gate driving circuit according to one or more embodiments may have the period of a low-level voltage (e.g., the first period P1, the third period P3, the fourth period P4, and the fifth period P5 of FIG. 5) in one frame relatively longer than the period of a high-level voltage (e.g., the second period P2 of FIG. 5). The gate driving circuit according to one or more embodiments may have stable gate signals output by minimizing the leakage current of turned-off transistors (e.g., the first transistor T1, the eighth transistor T8, etc. of FIG. 4) while pull-down transistors of the first output portion 230 and the second output portion 250 output a gate signal and a carry signal of a low-level voltage. According to one or more of the above-described embodiments, a gate driving circuit from which gate signals may be stably output and a display device including the gate driving circuit may be provided. The effect of the disclosure may not be limited thereto and may be variously expanded without departing from the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A gate driving circuit comprising:

a plurality of stages, each comprising:

- a node controller that controls voltage levels of a first node and a second node;
- a first output portion that outputs a gate signal having a voltage of a first level or a voltage of a second level lower than the first level according to the voltage levels of the first node and the second node;
- a second output portion that outputs a carry output signal having the voltage of the first level or a voltage of a third level lower than the second level according to the voltage levels of the first node and the second node, wherein the node controller comprises:

- a first stabilization transistor and a second stabilization transistor electrically connected in series between the first node and a voltage input terminal to which the voltage of the third level is applied; and
- a first capacitor electrically connected between the first stabilization transistor and the second stabilization transistor,
- the first stabilization transistor is electrically connected between the first node and the first capacitor and including a gate electrically connected to a first clock input terminal to which a first clock signal is applied, and the second stabilization transistor is electrically connected between the first capacitor and the voltage input terminal to which the voltage of the third level is applied and including a gate electrically connected to the second node.

2. The gate driving circuit of claim 1, wherein the node controller further comprises an initialization transistor electrically connected between the first node and the voltage input terminal to which the voltage of the third level is applied and including a gate electrically connected to a first carry input terminal to which a next carry signal is applied.

3. The gate driving circuit of claim 2, wherein the node controller further comprises a first transistor and a second transistor electrically connected in series between a second carry input terminal to which a start signal or a previous carry signal is applied and the first node, wherein the first transistor is electrically connected between the second carry input terminal and the second transistor and including a gate electrically connected to the second carry input terminal, the second transistor is electrically connected between the first transistor and the first node and including a gate electrically connected to a second clock input terminal to which a second clock signal is applied, and in case that the start signal or the previous carry signal is the voltage of the first level, the second clock signal is also the voltage of the first level.

4. The gate driving circuit of claim 3, wherein the previous carry signal is a carry signal output from an immediately preceding stage, and the next carry signal is a carry signal output from an immediately following stage.

5. The gate driving circuit of claim 3, wherein the node controller further comprises:

a third transistor electrically connected between the second clock input terminal and the second node and including a gate electrically connected to the first node; and a fourth transistor electrically connected between the second node and a voltage input terminal to which the voltage of the first level is applied and including a gate electrically connected to the second clock input terminal.

6. The gate driving circuit of claim 5, wherein the first clock signal and the second clock signal alternate between the voltage of the first level and the voltage of the third level, and the second clock signal has a phase difference of about 180 degrees with respect to the first clock signal.

7. The gate driving circuit of claim 1, wherein the first output portion comprises:

a first pull-up transistor electrically connected between the first clock input terminal and a first output terminal and including a gate electrically connected to the first node;

a first pull-down transistor electrically connected between a voltage input terminal to which the voltage of the second level is applied and the first output terminal and including a gate electrically connected to the second node; and a second capacitor electrically connected between the second node and the voltage input terminal to which the voltage of the second level is applied.

8. The gate driving circuit of claim 1, wherein the second output portion comprises:

a first pull-up transistor electrically connected between the first clock input terminal and a first output terminal and including a gate electrically connected to the first node;

a first pull-down transistor electrically connected between the voltage input terminal to which the voltage of the third level is applied and the first output terminal and including a gate electrically connected to the second node; and a second capacitor electrically connected between the first node and the first output terminal.

9. The gate driving circuit of claim 8, wherein the first pull-up transistor comprises a plurality of sub-transistors electrically connected in series.

10. The gate driving circuit of claim 9, wherein the first clock signal and a second clock signal alternate between the voltage of the first level and the voltage of the third level, and the first clock signal has a phase difference of about 180 degrees with respect to the second clock signal.

11. A gate driving circuit comprising:

a plurality of stages, each comprising:

a node controller that controls voltage levels of a first node and a second node;

a first output portion that outputs a gate signal having a voltage of a first level or a voltage of a second level lower than the first level to a first output terminal according to the voltage levels of the first node and the second node; and a second output portion that outputs a carry output signal having the voltage of the first level or a voltage of a third level lower than the second level to a second output terminal according to the voltage levels of the first node and the second node, wherein the first output portion includes a first pull-up transistor electrically connected between a first clock input terminal to which a first clock signal is applied and the first output terminal and including a gate electrically connected to the first node, the second output portion includes a second pull-up transistor electrically connected between the first clock input terminal and the second output terminal and including a gate electrically connected to the first node, and the second pull-up transistor includes a plurality of sub-transistors electrically connected in series.

12. The gate driving circuit of claim 11, wherein the first output portion further comprises:

a first pull-down transistor electrically connected between a voltage input terminal to which the voltage of the second level is applied and the first output terminal and including a gate electrically connected to the second node; and a first capacitor electrically connected between the second node and the voltage input terminal to which the voltage of the second level is applied.

13. The gate driving circuit of claim 12, wherein the second output portion further comprises:

a second pull-down transistor electrically connected between a voltage input terminal to which the voltage of the third level is applied and the second output terminal and including a gate electrically connected to the second node; and a second capacitor electrically connected between the first node and the second output terminal.

14. The gate driving circuit of claim 11, wherein the node controller comprises a first transistor and a second transistor electrically connected in series between a first carry input terminal to which a start signal or a previous carry signal is applied and the first node, wherein the first transistor is electrically connected between the first carry input terminal and the second transistor and including a gate electrically connected to the first carry input terminal;

the second transistor is electrically connected between the first transistor and the first node and including a gate electrically connected to a second clock input terminal to which a second clock signal is applied, and in case that the start signal or the previous carry signal is the voltage of the first level, the second clock signal is also the voltage of the first level.

15. The gate driving circuit of claim 11, wherein the node controller comprises a first transistor electrically connected between a first carry input terminal to which a start signal or a previous carry signal is applied and the first node and including a gate electrically connected to the first carry input terminal.

16. The gate driving circuit of claim 15, wherein the node controller further comprises:

a second transistor electrically connected between a second clock input terminal to which a second clock signal is applied and the second node and including a gate electrically connected to the first node; and a third transistor electrically connected between the second node and a voltage input terminal to which the voltage of the first level is applied and including a gate electrically connected to the second clock input terminal.

17. The gate driving circuit of claim 16, wherein the first clock signal and the second clock signal alternate between the voltage of the first level and the voltage of the second level, and the first clock signal has a phase difference of about 180 degrees with respect to the second clock signal.

18. The gate driving circuit of claim 16, wherein the node controller further comprises a fourth transistor electrically connected between the first node and a voltage input terminal to which the voltage of the third level is applied and including a gate electrically connected to a second carry input terminal to which a next carry signal is applied.

19. The gate driving circuit of claim 18, wherein the node controller further includes a fifth transistor and a sixth transistor electrically connected in series between the first node and the voltage input terminal to which the voltage of the third level is applied, the fifth transistor is electrically connected between the first node and the sixth transistor and including a gate electrically connected to the first clock input terminal, and the sixth transistor is electrically connected between the fifth transistor and the voltage input terminal to which the voltage of the third level is applied and including a gate electrically connected to the second node.

20. The gate driving circuit of claim 19, wherein the node controller further comprises a first capacitor electrically connected between the fifth transistor and the sixth transistor.

* * * * *